United States Patent [19]

Ray

[11] Patent Number: 5,592,527
[45] Date of Patent: Jan. 7, 1997

[54] IDENTIFICATION MARKER FOR X-RAY FILM WITH CARRYING CASE

[76] Inventor: Michael A. Ray, 3657 Rutger, St. Louis, Mo. 63110

[21] Appl. No.: 504,092

[22] Filed: Jul. 19, 1995

Related U.S. Application Data

[63] Continuation-in-part of Ser. No. 438,539, May 10, 1995, abandoned, which is a continuation of Ser. No. 327,143, Oct. 21, 1994, abandoned, which is a continuation of Ser. No. 6,239, Jan. 19, 1993, abandoned.

[51] Int. Cl.$^6$ .................................................. H05G 1/28
[52] U.S. Cl. .................................... 378/165; 378/162
[58] Field of Search ....................................... 378/162, 165

[56] References Cited

U.S. PATENT DOCUMENTS

| | | | |
|---|---|---|---|
| 2,018,175 | 10/1935 | Knight . | |
| 3,093,829 | 6/1963 | Maine | 2/2 |
| 3,296,437 | 1/1967 | Meschan | 250/67 |
| 3,569,713 | 3/1971 | Via, Jr. | 250/108 |
| 3,668,394 | 1/1972 | Panzer | 250/67 |
| 3,996,620 | 12/1976 | Maine | 2/2 |
| 4,058,733 | 11/1977 | Stembel | 250/476 |
| 4,127,774 | 11/1978 | Gillen | 250/476 |
| 4,194,625 | 3/1980 | Stievenart | 378/165 |
| 4,220,867 | 9/1980 | Bloch, Jr. | 250/516 |
| 4,250,389 | 2/1981 | Brendl et al. | 250/476 |
| 4,274,006 | 6/1981 | Caine | 250/476 |
| 4,286,170 | 8/1981 | Moti | 250/520 |
| 4,386,277 | 5/1983 | Forshee | 250/516.1 |
| 4,426,723 | 1/1984 | Rouse | 378/165 |
| 4,529,635 | 7/1985 | Sheldon | 428/40 |
| 4,669,106 | 5/1987 | Ammerman | 378/208 |
| 4,698,836 | 10/1987 | Minasian | 378/165 |
| 4,764,948 | 8/1988 | Hurwitz | 378/165 |
| 4,873,710 | 10/1989 | Lotman | 378/177 |
| 4,951,595 | 8/1990 | Bedford, Jr. | 116/200 |
| 4,953,193 | 8/1990 | Robinson | 378/162 |
| 4,995,108 | 2/1991 | Tanaka | 378/168 |
| 5,015,865 | 5/1991 | Sayers | 250/516.1 |
| 5,016,268 | 5/1991 | Lotman | 378/177 |
| 5,038,047 | 8/1991 | Still | 250/516.1 |
| 5,103,504 | 4/1992 | Dordevic | 2/243 A |
| 5,107,531 | 4/1992 | Elias | 378/175 |
| 5,115,461 | 5/1992 | Kranz et al. | 378/165 |
| 5,123,040 | 6/1992 | Fabian | 378/182 |

OTHER PUBLICATIONS

Wolf X–Ray Catalog ©1987, pp. 64–68 no month.
"Picker" Health Care Products vol. 5, pp. 137–145 no date.
"GE" Medical Systems Catalogue 1991–1992 pp. 190–193 no month.
"Cone" Instruments vol. 9 1991–1992 pp. 148–155 no month.

*Primary Examiner*—Craig E. Church
*Attorney, Agent, or Firm*—Polster, Lieder, Woodruff & Lucchesi, L.C.

[57] ABSTRACT

A marking device, preferably for use with x-ray film to be exposed, has an indicia supporting member that is transparent to the x-ray energy, at least one indicia opaque to the x-ray energy, a movable cover shield also opaque to the x-ray energy, an attaching means for temporarily securing the device to an x-ray film or a film cassette, and a removable carrying case. The cover shield is moved from a shielding position relative to the indicia to an non-shielding position relative to the indicia. When the indicia is not shielded then the indicia appears on the exposed x-ray film. The carrying case substantially encloses the attaching means to prevent its contamination when the marking device is not in use, and includes means for attaching the case and device to the user in a visible and accessible location, as well as containing radio opaque indicia for marking the film with additional information.

31 Claims, 3 Drawing Sheets

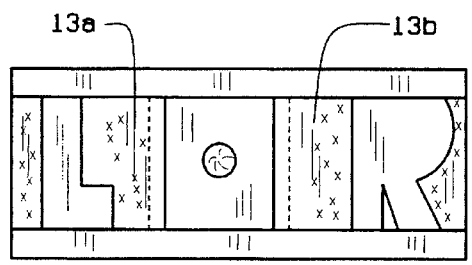
FIG. 1
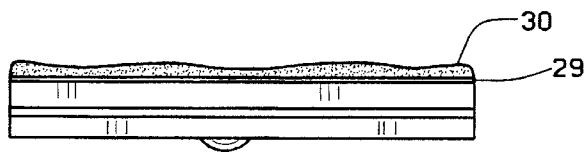
FIG. 2
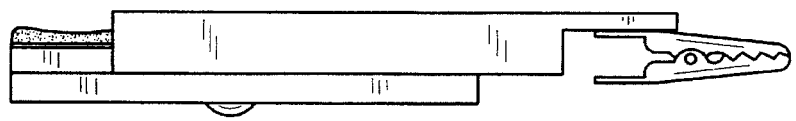
FIG. 3
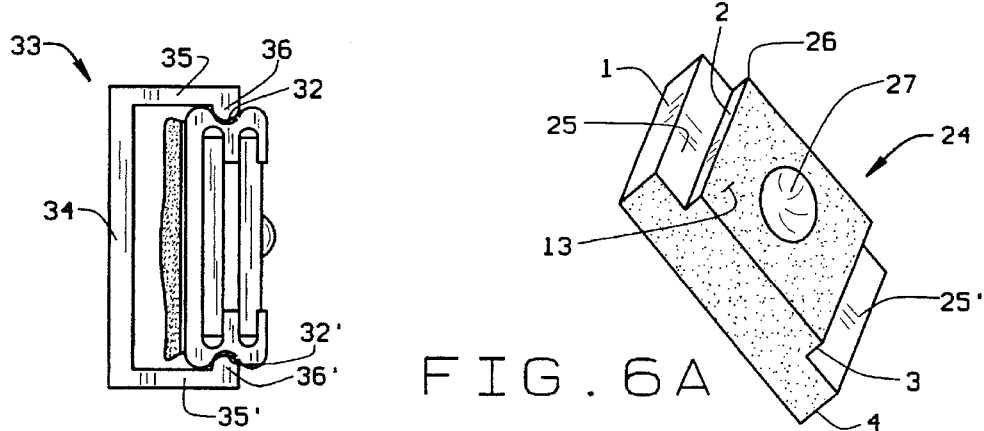
FIG. 4
FIG. 6A
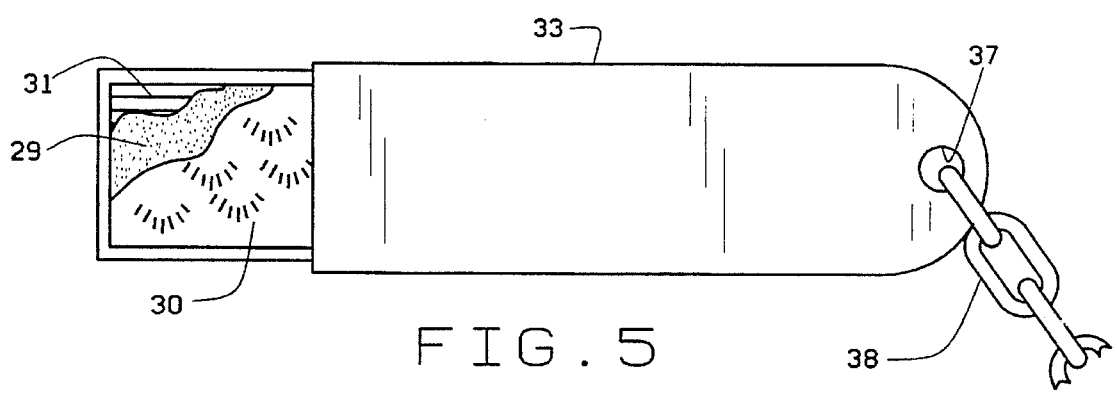
FIG. 5

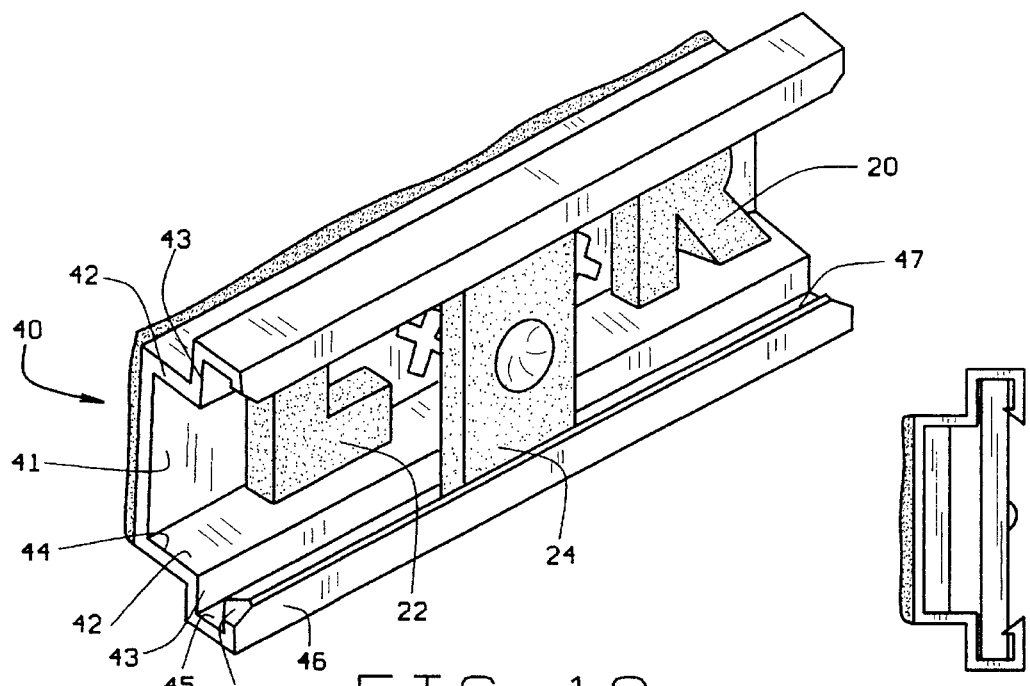
FIG. 10
FIG. 11
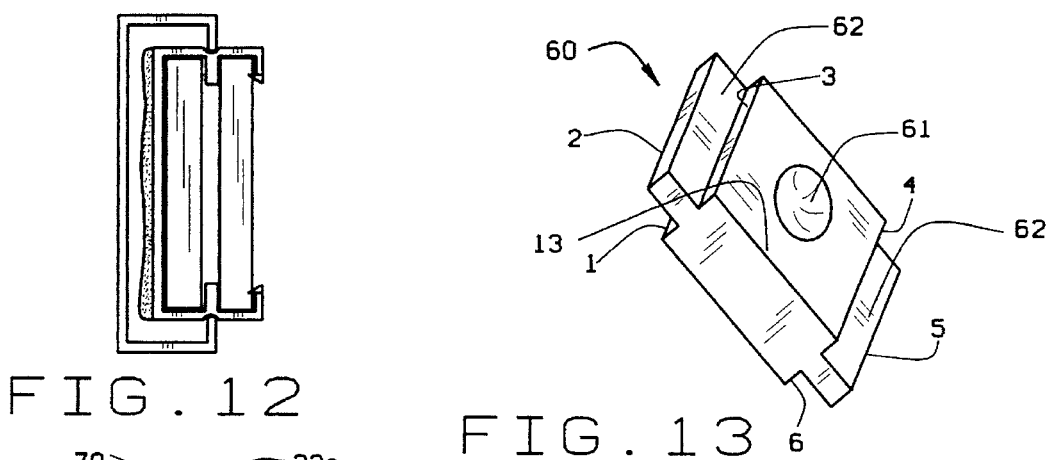
FIG. 12
FIG. 13
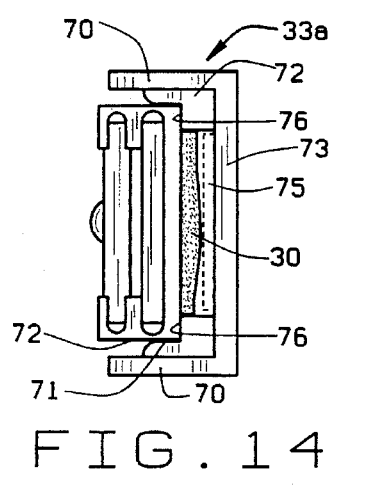
FIG. 14
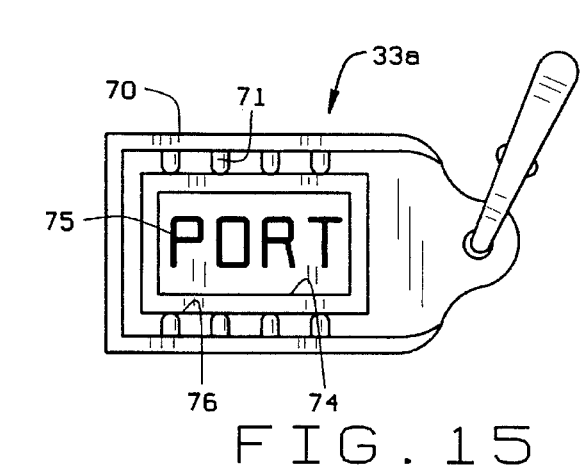
FIG. 15

IDENTIFICATION MARKER FOR X-RAY FILM WITH CARRYING CASE

RELATION TO PRIOR APPLICATIONS

This application is a continuation-in-part of Ser. No. 08/438,539, filed May 10, 1995 (now abandoned), which is a continuation of Ser. No. 08/327,143, filed Oct. 21, 1994 (now abandoned), which is a continuation of Ser. No. 08/006,239, filed Jan. 19, 1993 (now abandoned).

BACKGROUND OF THE INVENTION

I. Field of the Invention

The present invention relates to radio opaque identification markers for x-ray film, and more particularly to a self-contained device capable of clearly marking the film with a right or left designation, or other desired indicia typically used to identify an x-ray during and following exposure, in addition to other identification information such as a name to designate the facility or a serial number to designate the technician that is often required or desirable.

Specifically, the invention involves a self-contained device capable of marking a film with a right (R) or (L) designation and other identification indicia. The invention provides means for removably adhering the device to x-ray films. The invention provides a protective coating on the lead or other harmful metallic parts, including the indicia, to protect the user. The invention also includes a slidable x-ray impervious blocker shield with multi-points of sliding contact designed to smoothly slide along the device to alternatively cover and uncover the "L" and "R" indicia. In addition, the invention provides a holder for the device with means for attaching the holder to the user whereby the device is clearly visible and is easily and safely movable with the person of the user as well as always being readily available for use.

II. Prior Art

Commercially available radio opaque markers usually involve the assembly of individual letters onto a letter mount. These markers are costly to produce as they require the production of many individual pieces, and are time consuming to use because the letters or numbers or other indicia must be individually set up for each use. These markers do have the advantage of providing additional information as to the facility where the x-ray is taken or the x-ray technician involved in taking the x-ray. The most common markers are the two piece, left and right marker that may include the technician's name or number. These small markers are temporarily secured to the film cassette when in use by tape. This requires technician to carry messy tape and often results in loss of the small markers.

Permanent die-cut or permanently assembled lettered markers are more convenient, but require several markers to provide proper marking for different situations or applications.

Embossed clips, which clip onto an x-ray film cassette are simple to use, but do not provide any information beyond designating the x-ray left or right, beginning or end, or other simple, fixed indicia. They also do not allow collimation of the x-ray beam for patient safety.

It is known to provide a self-contained variable information marker which consists of several dye cut wheels. The dye cut wheels turn to allow variable information to be marked on the exposed x-ray during the exposure process. The drawbacks of this device include the high cost, due to the individually die-cut wheels, and the size limitation of marking devices which results in the exposed letters being extremely small and hard to read on the exposed x-ray film, nor can the technician collimate the x-ray beam for patient safety.

Commercially available means to attach these devices to the x-ray film cassette are limited. The most common removable attachment means is tape or hook and loop material, or Velcro, which is difficult to keep clean and sanitized. This limitation is especially important in emergency room situations, since body fluids may be present which, if able to contact the hook or loop, are difficult to remove in order to sanitize the hook or loop material before the next use. The use of tape is messy and time consuming.

It is an object of the present invention to provide a self-contained x-ray marking device which can be used to designate either left and right on the exposed x-ray film, as well as other desired identification indicia.

It is a further object of the present invention to vary the information on the exposed x-ray without modification to the marking device.

Still a further object of the present invention is to provide a marking device whose construction is compact enough to provide relatively large, and therefore easy to read, symbols on the exposed x-rays.

It also is an object of the present invention to provide a marking device which is securely attachable to the x-ray film or x-ray cassette, but which is easily removable without leaving any significant residue. The marking device of the present invention can be cleaned and sanitized without significant difficulty, and comprises a removable protector/marker carrying case for substantially preventing the contamination of the attaching means when the marking device is not in use.

It is still another object of the invention to provide a removable protector/holder/marker for the device, in combination with means for attaching the holder to the clothing of the user, whereby the device is accessible and readily available to the user at all times and can be used as a separate marker as well.

It is a further object of the present invention to provide a coating on the opaque lead, or other harmful metal parts or marking indicia, to protect the user of the device.

It is also an object of the present invention to provide a slidable blocker shield which has multi-points of sliding surface contact with the marker body to provide a smooth sliding movement when moved to cover or uncover the "L" or "R" marker.

These and other objects and advantages of the present invention will be readily apparent in view of the drawings and the following description and discussion.

SUMMARY OF THE INVENTION

To accomplish the foregoing and other objects of this invention, there is provided a self-contained x-ray film marking device. The device has an elongated radio transparent field on which are located radio opaque indicia, for example, letters designating right and left, on the exposed x-ray. At the center of a base member additional information can be permanently attached or can be removable. Examples of such data are initials or a serial number identifying the technician handling the x-ray.

A movable radio opaque cover piece or blocker shield is slidable across the face of the marking device to cover the "L" or the "R", thereby shielding one of the chosen symbols, the unshielded symbol being marked on the film by the exposed radiographic media. This block or shield usually is a soft lead and is designed with multiple points of area surface contact with a groove in the marker body to prevent jamming or rotation when sliding. This design insures proper movement and is necessary because the soft lead will bind in a hard metal track.

The blocker shield is provided with a protective radio impervious coating to protect the user when the user touches the part during movement for letter selection.

Means are provided for attaching the marking device to an x-ray film. In one preferred embodiment, putty is epoxyed to the marker on one side to ensure that the putty stays on the marker. The other side of the putty holds the device in a releasable manner relative to an x-ray cassette proximate the area or bone of the subject of the x-ray and is easily removed from the cassette or other film holder without leaving any significant residue. Putty has the further advantage of being easily replaced if it should become dirty or contaminated. In this fashion the present invention can be used on conventional x-ray cassettes or other surfaces known to one skilled in the art.

A carrier case or removable shield/marker also is provided for the marking device to protect the putty from contamination. The carrier case has means for attaching the carrier to the person of the user by a chain or clip in an accessible and visible location. This case/shield/marker can also be used as a marker if a technician desires. The carrier or removable shield/marker has lead letters which provide still more information if the technician wishes to use it. An example would be the carrier/removable shield/marker may have the letters "port" which would mark the film as such meaning "portable".

BRIEF DESCRIPTION OF THE DRAWINGS

In the drawings, wherein like numbers refer to like parts wherever they occur,

FIG. 1 is a front elevational view of a preferred form of the marking device showing a radio opaque blocker shield located at the center of a base;

FIG. 2 is a top plan view of the marking device shown in FIG. 1;

FIG. 3 is a top plan view similar to FIG. 2 of the marking device shown with a carrying case attached and partially open;

FIG. 4 is a left side elevational view of the marking device shown in FIG. 3;

FIG. 5 is a fragmentary view of the back of the marking device of FIG. 3 shown with the carrying case partly open, revealing the putty and epoxy holding same in place on the marking device along with the left back surface of the marking device where the putty has been partially broken away to show both the back of the base and the adhesive epoxy which holds the putty securely to the back of the base surface;

FIG. 6A is a perspective view of the blocker shield shown in FIG. 6;

FIG. 10 is a perspective view of another modification of the device;

FIG. 11 is an end elevational view of the device of FIG. 10;

FIG. 12 is an end elevational view of another modification of the invention;

FIG. 13 is a perspective view of a modified blocker shield with a protective coating;

FIG. 14 is a detailed end elevational view of a modification of the carrying case and device; and FIG. 15 is a front plan view of another modification of the carrying case.

DETAILED DESCRIPTION

Figure 6:
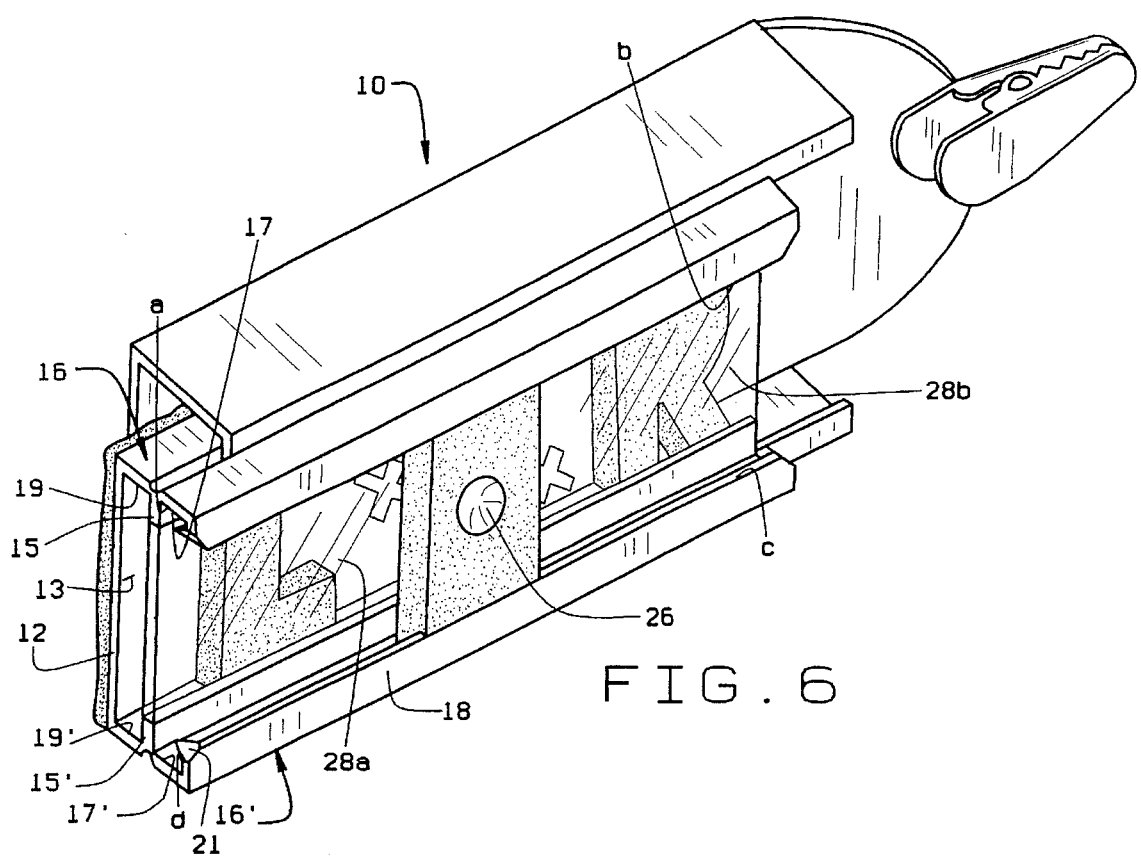
FIG. 6 is a perspective view of the marking device shown with the carrying case attached and partially open.

The preferred form of the device 10 as shown in FIGS. 1–8 and possibly best seen in FIG. 6, includes a radio transparent elongated base 12 having a symbol support field 13, and upstanding L-shaped projections 16 and 16', having inturned edge portions 18,18' generally parallel to the support field 13. Inwardly positioned spacers 15,15' are intermediate the inturned edge portions 18,18' and the support field 13 and define parallel pairs of channels 17,17', and 19,19' along the upstanding sides 16,16' of the base 12. The radio opaque symbols, a letter "R" 20 and a letter "L" 22, are attached proximate the opposing ends of the support field 13 in the channels 19,19' to designate "right" or "left" on the exposed x-ray film. The letters 20,22 are preferably made of lead and it is believed that they should be a minimum of 1.5 mm thick for proper exposure and marking on the exposed x-ray.

Additional radio opaque symbols 28 are either permanently or removably attached proximate to the center of the support field 13 to provide additional information on the exposed x-ray, such as, the facility name or initials of the technician or the technician's identification number. A preferred size of the base 12 suitable for an x-ray marking device 10 in accordance with the present invention would be approximately 55 mm by approximately 20 mm.

The spacers 15 and 15', which are preferably at least the depth of the letters 20 and 22, run along the L-shaped projections 16 and 16' partially defining two pairs of parallel channels 17,17' and 19,19'. The letters 20, 22 are positioned in the first pair of channels 19,19' defined by the base 12, and the spacers 15,15'.

A blocker shield 24 slides freely in the channel pairs 17,17'. The blocker shield 24 has a pair of rabbets 25,25'. The rabbets 25,25' slide in the channels 17,17' and provide four points of sliding contact with the channels 17,17' to prevent the soft lead shield 24 from turning in the harder metal channels 17,17' and becoming jammed and immovable. The edges of contact are identified by the numerals 1, 2, 3, 4 on the blocker shield 24 and the letters a, b, c, d on the channels 17,17' (FIGS. 4 and 6). The face of the blocker shield 24 has a protective coating 26 on it to insure safe handling. It also can be roughened or serrated to provide means for the user to slide it along the track 17,17'. As shown, a raised projection 27 is used to slide the blocker 24. The depth of the spacers 15, 15' is selected so as to allow the cover 24 to freely slide over the letters 20, 22 and shield one or the other of the letters 20,22 during the exposure of the film to x-ray radiation.

The edges 18,18' of the L-shaped projections 16,16' are generally perpendicular to the support field 13, and in a preferred embodiment, may be partially or completely crimped at their ends 21,21' or the ends of the channels 17,17' may be blocked with epoxy, in order to retain the blocker shield 24 in the channel pairs 17,17'. Any suitable means can be used to block the ends of the channel pairs 17,17' and 19,19'.

Positioned between the spacers 15, 15' is a plastic divider 28 to separate the channels 19,19' and 17,17'.

FIGS. 2–5 show the top, bottom and side views of the illustrated device 10.

A preferred embodiment of the device 10 includes a putty substance 30 applied to the back with an adhesive 29, preferably glue or epoxy to keep the putty securely attached to the base 12. The other side of the putty 30 is sufficiently soft and sticky to allow temporary attachment of the device 10 onto the unexposed x-ray film or associated film cassette (not shown). FIG. 6 shows a portion of the putty 30 partially broken away in order to show the glue and epoxy holding putty 30 and also illustrates grooves or projections 31 provided on the base 12 to assist the adhesive 29 in holding the putty 30 to the base 12. The putty 30 provides secure, although temporary attachment to and easy removal from the x-ray film or film cassette, and can be cleaned or replaced after a period of continued use.

A carrying case protector shield/marker 33 holds the device 10 when it is not in use. The case 33 can be designed to retain the device 10 in various ways. As illustrated in FIGS. 3–7, the preferred form of the case 33 has a base 34, upstanding sides 35,35' and inwardly turned top edges 36,36'.

The side edges 18,18' of the device 10 are provided with grooves 32,32' on their outside surfaces to slidingly receive the carrying case top edges 36,36', respectively. The edges 36,36' and the grooves 32,32' preferably are curved with dissimilar curvatures to provide a slidable friction fit therebetween to retain the device 10 in the case 33.

The height of the sides 35,35' is such that the putty 30 is spaced from the inside of the base 34 to protect the putty 30 from contamination or damage when the device 10 is not in use.

In a preferred form of the invention, the case 33 is provided with an opening 37 in the base 34 to which is attached to a chain 38 (FIG. 5) or alligator clip (FIG. 3) as a means for attaching the device 10 to the person of the user in a prominent place on the user's clothing when the device 10 is not in use. This also prevents loss of the case 33 between uses. The case may hold additional lead letters or other information and be used as a marker as well.

In use, the blocker shield or cover 24 is moved along the second pair of channels 17,17' and across the support field 13 into position over one of the letters 20,22.

The device 10 is located proximate the body area which is subject to the x-ray for protection of the patient. Use of the device of the present invention allows the use of a more focused collimation than can be used with clip-on devices in which the x-ray collimation is such that the exposure must extend to the edge of the cassette, since that is the typical location of the conventional x-ray marker. This is accomplished without modifying the film cassette or requiring a special film cassette.

With the collimation more focused, the tightened x-ray beam provides more detail, for example more bone detail, and generally enhanced radio-graphic detail. This is all accomplished without overexposing the patient just to get an edge mounted marker in the exposed portion of the film. This improvement can only be accomplished with the present invention and is due to the improved method which allows choosing marker location with respect to the patient's needs and not to the size of the film cassette and its position relative to the patient and the x-ray beam.

Figure 7:
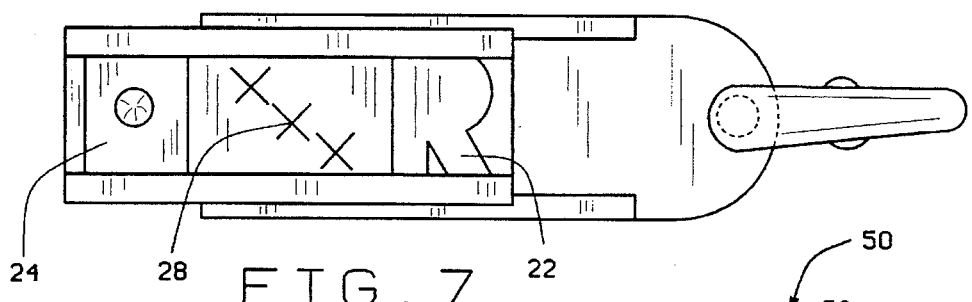
FIG. 7 is a front elevational view of the marking device of FIG. 3 shown with the carrying case attached and partially open, showing the blocker shield positioned over the "L" to indicate "right" on the exposed x-ray.
Figure 8:
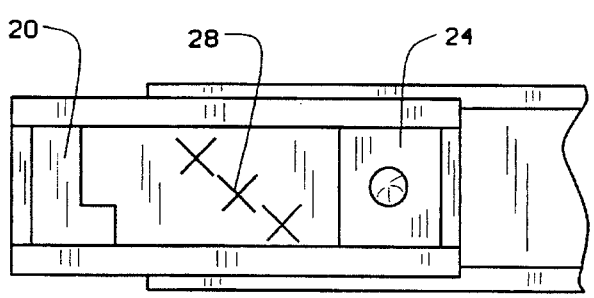
FIG. 8 is a fragmentary front elevational view of the marking device of FIG. 3 shown with the blocker shield positioned over the "R" to indicate "left" on the exposed x-ray.

FIG. 7 shows the cover 24 shielding the letter L 20 so that the exposed x-ray will be marked "right". FIG. 8 shows the cover 24 shielding the letter R 22 so that the exposed x-ray is marked "left". In both cases the additional information 28 is exposed to the x-ray radiation. This allows marking of both "left" or "right" and additional information without use of individual lettering devices or a separate identification piece.

In use, the case 33 is removed so as not to interfere with the attachment of the device 10 to the x-ray film or film cassette. When the case 33 is used as a marker device, it is simply placed beside the marker on a film cassette surface.

From the foregoing description, those skilled in the art will appreciate that all the objects of the present invention are realized. A self-contained x-ray marking device capable of designating left or right on an x-ray as provided. The marking device disclosed herein further provides additional information such as the facility or the technician handling the x-ray. The compact design results in large letters which are easy to read on the x-ray. Further the device is easily attached to and removed from the x-ray exposure to be marked, is easily cleaned, and has an detachable carrying case.

In another embodiment of the invention, plastic divider 28 above the inside of the support field 13 is colored differently above the "L" and "R" to assist the user in rapidly and conveniently knowing which letter was not blocked and which letter was blocked. For example, the background 28a above the "L" can be blue or green, etc., and the background 28b above the "R" can be red for right, etc. This is shown in FIG. 6.

FIGS. 10 and 11 show another embodiment of the device 40. In this embodiment, the device 40 has generally a T-shaped body with a base 41 defining the support field for the indicia 20,22. Upstanding walls 42 connect the base 41 to outwardly flared shoulders 43 to define a first channel 44 which holds the indicia 20,22. A second set of upstanding walls 45 terminate in inturned edges 46 to define with the shoulders 43 a second channel 47 in which the blocker shield 24 slides. Inturned end 48 hold the blocker shield 24 in the channel 47.

Figure 9:
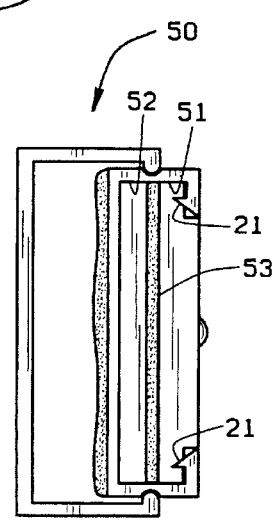
FIG. 9 is an end elevational view of a modification of the device.

Another modification of the invention is shown in FIG. 9. In this variation, the device 50 is similar to that shown in FIGS. 1–7 except that the means for defining the upper channel 51 (in which the blocker shield slides) and the lower channel 52 (which holds the indicia) is a divider 53, which can be plastic or other suitable radiolescent material.

FIG. 13 shows another form of the blocker shield in which the blocker shield 60 has a main body section 61 and two slide tabs 62 projecting outwardly from the main body section 61 and slidable in the channels 17,17'. This construction allows six contact points, as noted by the numerals 1,2,3,4,5,6 between the body 61 and the tabs 62 and the channel longitudinal sliding line 17,17' to prevent jamming the shield 60 in the slides 17,17'. The numerals 1, 2, 3, 4,5,6 denote the longitudinal lines which define the edges of the body 61 and the tabs 62 which engage corresponding edges on the channels 17,17'.

The blocker shield 24 and the indicia 20,22, et al. preferably are coated with a plastic (indicated by the speckling on the blocker shield in FIGS. 6 and 13) and the "L" and "R" in FIG. 10. This prevents any metallic residues or discharges from the lead or other radio opaque material from coming in contact with the user.

FIGS. 14 and 15 show another form of attaching the device 10 to the holder 33. The sidewalls 70 of the carrier 33$^a$ are provided with vertical ribs 71 which provide a friction fit for the smooth outer sidewalls 72 of the device 10. In the bottom wall 73 there is provided a well 74 which holds further indicia 75 which allow the holder 33$^a$ to be clipped to an x-ray film to further identify it. The putty 30 is restricted in its location so that the device 10 can bottom on the top surface 76 which forms the well 74.

While specific embodiments have been shown and described, many variations are possible. The device base and protector shield may be made from any material which is radio transparent, including plastic. The means to cover and shield a radio opaque symbol may include any means to slide, flip or hold a cover shield over one of the symbols. Finally, the dimensions provided are illustrative only, and may be modified for a particular application, for example, the thickness of the indicia may vary depending upon the strength of the x-ray source.

The preferred putty to attach the device to the x-ray can be any substance which will securely attach to and easily remove from the x-ray that is capable of being cleaned.

It is intended that some or all of the indicia may be permanently attached to the support field during manufacturing. It will be further understood that in the event that some or all of the indicia could vary with time or location, for example, as the technician moves between facilities or jobs, that the indicia be affixed only semi-permanently.

Although x-ray radiation is discussed in the foregoing disclosure, it will be understood that the marker and method of the present invention is suitable for use with other exposure systems and associated radiation source. It will only be necessary to select materials that are opaque and transparent to the particular radiation or other exposing source that is being used.

Having described the invention in detail, those skilled in the art will appreciate that modifications may be made of the invention without departing from the spirit. Therefore, it is not intended that the scope of the invention be limited to the specific embodiment illustrated and described. Rather it is intended that the scope of this invention be determined by the appended claims and their equivalents.

What is claimed is:

1. A self-contained film marker for x-ray films comprising
   (a) a field defined by an elongated base which is transparent to an x-ray energy source used to expose an x-ray film sensitive to the x-ray energy source,
   (b) a pair of juxtaposed channels positioned on the field,
   (c) a pair of laterally spaced marking symbols positioned in one of the channels on the field, the symbols being opaque to the x-ray energy source used to expose the x-ray film,
   (d) an x-ray energy opaque cover positioned in the second channel and movable therealong, the cover being of a size to allow shielding of one of the marker symbols, and
   (e) a putty permanently bonded to the marker and attached to the x-ray film cassette during exposure to the x-ray radiation and detachable therefrom without leaving significant residue.

2. The marker of claim 1 including a carrying case having means for frictionally engaging the marker.

3. The marker of claim 1 wherein the field and channels are embodied in a structure having a base which defines the field and upstanding longitudinal sides terminating in an inturned top edge generally parallel to the base and intermediate spaced elements between and parallel to the base and the top edges to define the channels therewith.

4. The marker of claim 2 wherein the carrying case has means for engaging it to the outer person of the user.

5. The marker of claim 1 wherein the marking symbols are fixed on the field in the lowermost channel and the cover is movable along the upper channel.

6. The marker of claim 1 including means for retaining the slidable cover in its channel.

7. The marker of claim 1 wherein the x-ray opaque symbols and the cover are lead.

8. The marker of claim 7 wherein the cover is coated with a protective coating to protect the user from residues from the x-ray opaque marker during movement of the cover.

9. The marker of claim 1 including means on the cover to assist the user in sliding it along its channel.

10. The marker of claim 2 including radio opaque indicia on the carrying care.

11. The marker of claim 1 wherein the marking symbols indicate right and left.

12. The marker of claim 1 including identifying radio opaque indicia positioned between the laterally marking symbols.

13. The marker of claim 11 wherein the portions of the field on which the right and left symbols are located are colored differently to assist in identification.

14. The marker of claim 1 wherein the second channel is provided with opposed parallel grooves and the cover has a body with outwardly aligned wings on each longitudinal edge which ride in the said grooves causing multiple points of contact to prevent rotation of the cover when it is moved along the said second channel.

15. A self-contained x-ray film marking device, comprising:
   an elongated base defining a support field and including two x-ray radiation transparent L-shaped projections extending from and extending the length of the elongated side edges of the base,
   spacers located along the L-shaped projections, thereby forming a first channel with the base and a second channel with the projections,
   the device further including x-ray radiation opaque marking symbols permanently attached in the first channel to the base support field,
   an x-ray radiation opaque cover of a size capable of shielding at least one of the marking symbols and of a depth necessary to allow the cover to slide along the second channel formed by the L-shaped projection and the spacers, and
   means to attach the marker to a cassette containing the film during exposure to x-ray radiation.

16. The marker of claim 15 wherein the second channel is provided with opposed parallel grooves and the cover has a body with outwardly aligned wings on each longitudinal edge which ride in the said grooves causing multiple points of contact to prevent rotation of the cover when it is moved along the said second channel.

17. The marking device as defined in claim 15 wherein the means to attach the marker to the film is a putty capable of holding the device securely while being removable without leaving significant residue.

18. The marking device as defined in claim 15 wherein the marking symbols further include additional identification information.

19. The marking device as defined in claim 15 wherein the marking symbols designate beginning and end.

20. The marking device as defined in claim 15 wherein the marking symbols designate right and left.

21. The marking device as defined in claim 15 wherein the base support field and projections are aluminum.

22. The marking device as defined in claim 15 wherein the radio opaque symbols and the cover are lead.

23. The marker of claim 22 wherein the radio opaque cover is coated with a protective coating to protect the user from residue from the cover during movement of the cover.

24. The marker of claim 15 including means for retaining the slidable cover in its channel.

25. The marker of claim 15 including a carrying case retaining the marker and having means for engaging it to the outer clothing of the user.

26. A self-contained x-ray film marking device comprising (a) an elongated base defining a support field and having upstanding side walls defining a first channel, (b) outwardly extending U-shaped portions connected to the top edges of said side walls with the open tops of the said U-shaped portions facing each other to define a second channel over the first channel, (c) x-ray radiation opaque marking symbols fixed in the said first channel, (d) an x-ray radiation opaque cover sized to cover one of said marking symbols positioned in and slidable along the said second channel, and (e) means to attach the marker to a cassette containing the film during exposure to x-ray radiation.

27. The marking device as defined in claim 26 wherein the means to attach the marker to the film is a putty capable of holding the device securely while being removable without leaving significant residue.

28. The marker of claim 26 wherein the cover is coated with a protective coating to protect the user during movement of the cover.

29. The marker of claim 26 wherein the second channel is provided with opposed parallel grooves and the cover has a body with outwardly aligned wings on each longitudinal edge which ride in the said grooves causing multiple points of contact to prevent rotation of the cover when it is moved along the said second channel.

30. The marker of claim 26 including means for retaining the slidable cover in its channel.

31. The marker of claim 26 including a carrying case retaining the marker and having means for engaging it to the outer clothing of the user.

* * * * *